United States Patent
Petride et al.

(10) Patent No.: US 9,135,301 B2
(45) Date of Patent: Sep. 15, 2015

(54) PUSHDOWN OF SORTING AND SET OPERATIONS (UNION, INTERSECTION, MINUS) TO A LARGE NUMBER OF LOW-POWER CORES IN A HETEROGENEOUS SYSTEM

(71) Applicant: Oracle International Corporation, Redwood Shores, CA (US)

(72) Inventors: Sabina Petride, Hayward, CA (US); Sam Idicula, Santa Clara, CA (US); Rajkumar Sen, Redwood Shores, CA (US); Nipun Agarwal, Saratoga, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 187 days.

(21) Appl. No.: 13/831,279

(22) Filed: Mar. 14, 2013

(65) Prior Publication Data
US 2014/0280037 A1 Sep. 18, 2014

(51) Int. Cl.
*G06F 17/30* (2006.01)

(52) U.S. Cl.
CPC .... *G06F 17/30442* (2013.01); *G06F 17/30306* (2013.01); *G06F 17/30463* (2013.01); *G06F 17/30595* (2013.01)

(58) Field of Classification Search
CPC ............... G06F 17/30463; G06F 17/30442
USPC .................................................. 707/999, 719
See application file for complete search history.

(56) References Cited

U.S. PATENT DOCUMENTS

| | | | | |
|---|---|---|---|---|
| 4,769,772 A * | 9/1988 | Dwyer | | 707/714 |
| 5,247,664 A * | 9/1993 | Thompson et al. | | 1/1 |
| 5,511,186 A * | 4/1996 | Carhart et al. | | 1/1 |
| 5,778,354 A * | 7/1998 | Leslie et al. | | 707/715 |
| 6,275,818 B1 * | 8/2001 | Subramanian et al. | | 1/1 |
| 6,980,988 B1 * | 12/2005 | Demers et al. | | 1/1 |
| 7,206,805 B1 * | 4/2007 | McLaughlin, Jr. | | 709/203 |
| 7,383,247 B2 * | 6/2008 | Li et al. | | 1/1 |
| 7,617,179 B2 * | 11/2009 | Nica | | 707/705 |
| 7,636,735 B2 * | 12/2009 | Haas et al. | | 707/705 |

(Continued)

OTHER PUBLICATIONS

Cieslewicz et al., "Adaptive Aggregation on Chip Multiprocessors", VLDB, dated Sep. 23-28, 2007, 12 pages.

(Continued)

*Primary Examiner* — Pierre Vital
*Assistant Examiner* — Andrew N Ho
(74) *Attorney, Agent, or Firm* — Hickman Palermo Becker Bingham LLP; Ellen Y. Wei

(57) ABSTRACT

A system and method for performing a query operation on a pair of relations in a database system coupled to a heterogeneous system (HS) is disclosed. Assuming that that pair of relations is partitioned and already loaded into the HS, the database system receives a query on the pair of relations and based on the type of query operation computes the cost of performing the query operation on the database alone or the costs of performing the query operation with the assistance of the HS, each of the costs corresponding to a particular algorithm. If the costs indicate that the HS improves the performance of the query operation, then the HS computes portions of the operation, and returns the results back to the database system. If any parts of the relation are out of sync with the database system, the database system performs operations to maintain transactional consistency.

18 Claims, 11 Drawing Sheets

(56) References Cited

U.S. PATENT DOCUMENTS

| | | | |
|---|---|---|---|
| 8,244,718 B2* | 8/2012 | Chamdani et al. | 707/718 |
| 8,442,971 B2* | 5/2013 | Bestgen et al. | 707/718 |
| 2003/0100960 A1* | 5/2003 | Edwards et al. | 700/28 |
| 2004/0220923 A1* | 11/2004 | Nica | 707/769 |
| 2006/0218123 A1* | 9/2006 | Chowdhuri et al. | 707/716 |
| 2007/0067274 A1* | 3/2007 | Han et al. | 707/713 |
| 2008/0114803 A1* | 5/2008 | Chinchwadkar et al. | 707/803 |
| 2009/0043750 A1* | 2/2009 | Barsness et al. | 707/723 |
| 2010/0169381 A1* | 7/2010 | Faunce et al. | 707/797 |
| 2010/0241622 A1* | 9/2010 | Jin et al. | 707/719 |

OTHER PUBLICATIONS

Shatdal et al., "Adaptive Parallel Aggregation Algorithms", dated 1995, 11 pages.

DeWitt et al., "Parallel Database Systems: The Future of High Performance Database Systems", Communications of the ACM, dated Jun. 1992, vol. 35, No. 6, 14 pages.

Oracle, Exadata, "A Technical Overview of the Oracle Exadata Database Machine and Exadata Storage Server", An Oracle White Paper, dated Jun. 2012, 36 pages.

Cruanes et al, "Parallel SQL Execution in Oracle 10g" SIGMOD, dated Jun. 13-18, 2004, 5 pages.

Oracle, Oracle White Paper, "Oracle Database Parallel Execution Fundamentals" dated Oct. 2010, 33 pages.

Ye et al., "Scalable Aggregation on Multicore Processors", AMC, dated Jun. 13, 2011, 9 pages.

Oracle Rac: "Architecture and Performance", Angelo Pruscino, Industrial Paper, SIGMOD, dated 2003.

* cited by examiner

PUSHDOWN OF SORTING AND SET OPERATIONS (UNION, INTERSECTION, MINUS) TO A LARGE NUMBER OF LOW-POWER CORES IN A HETEROGENEOUS SYSTEM

FIELD OF INVENTION

The present application relates generally to performing queries in a database system and more particularly to performing queries in a database system with the assistance of a heterogeneous system, based on a cost model.

BACKGROUND

Sort and Set Queries on Large Relations

Certain types of sorting operations on a relation and set operations on pairs of relations create performance problems when the relations involved are very large. In the case of sorting, a current approach splits the relations into subsets, which are recursively sorted, and then merges the resulting subsets into a final result. For very large relations, it is likely that at the various stages of execution, only subsets of the relations involved are kept in memory and other subsets awaiting processing are kept on disk.

Divide and conquer algorithms, such as above, are well suited for taking advantage of increased parallelism in modern CPUs. However, there is a limit on the degree of parallelism that can be achieved in practice when query engines operate on data stored in local memory and disks. The practical degree of parallelism remains relatively low even for most common clustered databases.

Improving the performance of such operations typically involves increasing the number of CPUs working on the operation. These CPUs are expensive, specialized for a particular operation, and have high power consumption.

Heterogeneous Systems

For sort and set operations on large relations, database systems can benefit from Heterogeneous Systems (HS). These systems are ones with a large number of disk-less compute nodes, each with its own main memory, and a high-speed interconnect among the nodes. As the number of nodes is very large, the amount of memory aggregated over all of the nodes is also very large. The database system using the HS has access to an in-memory representation of the relation in the HS and to persistent storage where the relation is stored.

Heterogeneous Systems are often organized in the form of a set of clusters of hierarchies, each cluster having a tree-like structure. Each leaf in the tree has a compute node and memory and is connected via switches that reside at multiple levels in the tree. Compute nodes in the hierarchy are built for both very efficient processing of a well-defined set of query primitives and low power consumption. The types of processors at each of the compute nodes can be different from processors elsewhere in the hierarchy or from processors in a database system that connects to the heterogeneous system.

In one embodiment, a hierarchy has a total of 2000 compute nodes and a total of 10 terabytes (TB) of memory distributed over the nodes capable of fitting large relations. In that embodiment, three levels of switches couple the tree-like cluster together and a link, such as Infiniband, couples the cluster to the database system.

A heterogeneous system offers many benefits, such as a very high degree of parallelism, high throughput, and low power for sort and set operations on large relations. However, a heterogeneous system may have cost-benefit tradeoffs in its use. Cost-benefit tradeoffs include comparison of the cost of loading portions of the relation into the heterogeneous system and collecting the results with the benefits of any improvement in the time and power consumed when the heterogeneous system assists in the group-and-aggregate operation. Additionally, because the heterogeneous system has no persistent storage for storing redo logs, the database system incurs a cost to assure transactional consistency.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Performance of sort and set operations are improved by partitioning the relations and moving the partitions to a heterogeneous system, which drastically increases the degree of parallelism at which sorting and set operations execute.

The database system uses a number of criteria to decide when the assistance of the cluster improves performance and modifies the sort and union operations for operation in the heterogeneous system.

The database system provides a query processing infrastructure, statistics including histograms and cardinality estimations, and a query optimizer. An embodiment adds a cost-based optimizer to the database system and a modified row source for sort and set operations to account for the database system consuming and transforming types of the relation collected from the cluster.

One embodiment is a computer system for performing a query operation on a pair of relations where the computer system includes a database system and a heterogeneous system (HS). The HS is coupled to the database system and includes a plurality of compute nodes arranged in one or more hierarchies, where each hierarchy of the one more hierarchies has a plurality of leaf nodes, a plurality of intermediate nodes and a root node and each of the plurality of leaf nodes is coupled to an intermediate node and each of the intermediate nodes is coupled to either another intermediate node or to the root node. The database system is configured to receive a request to perform the query operation on the pair of relations, determine a type of query operation from the request, compute a cost of performing the query operation on the database system alone, compute one or more costs of performing the query operation on the database system with assistance of the HS, where each of the one or more costs corresponds to a particular algorithm for performing the query operation, and where portions of the query operation on the pair of relations can be performed on one or more of the plurality of leaf nodes, the plurality of intermediate nodes, or the root node in each hierarchy. The database system is further configured to compare the costs to determine whether to use the assistance of the HS for the requested query operation, select for the query operation an algorithm with the lowest cost based on the comparison, and perform portions of the query operation in accordance with the selected algorithm on the pair of relations. The HS is configured to perform portions of the query operation in accordance with the selected algorithm on the pair of relations on one or more of the plurality of leaf nodes, the plurality of intermediate or switch nodes, the root node, and transmit results of the query operation to the database system.

DRAWINGS

DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Figure 1:
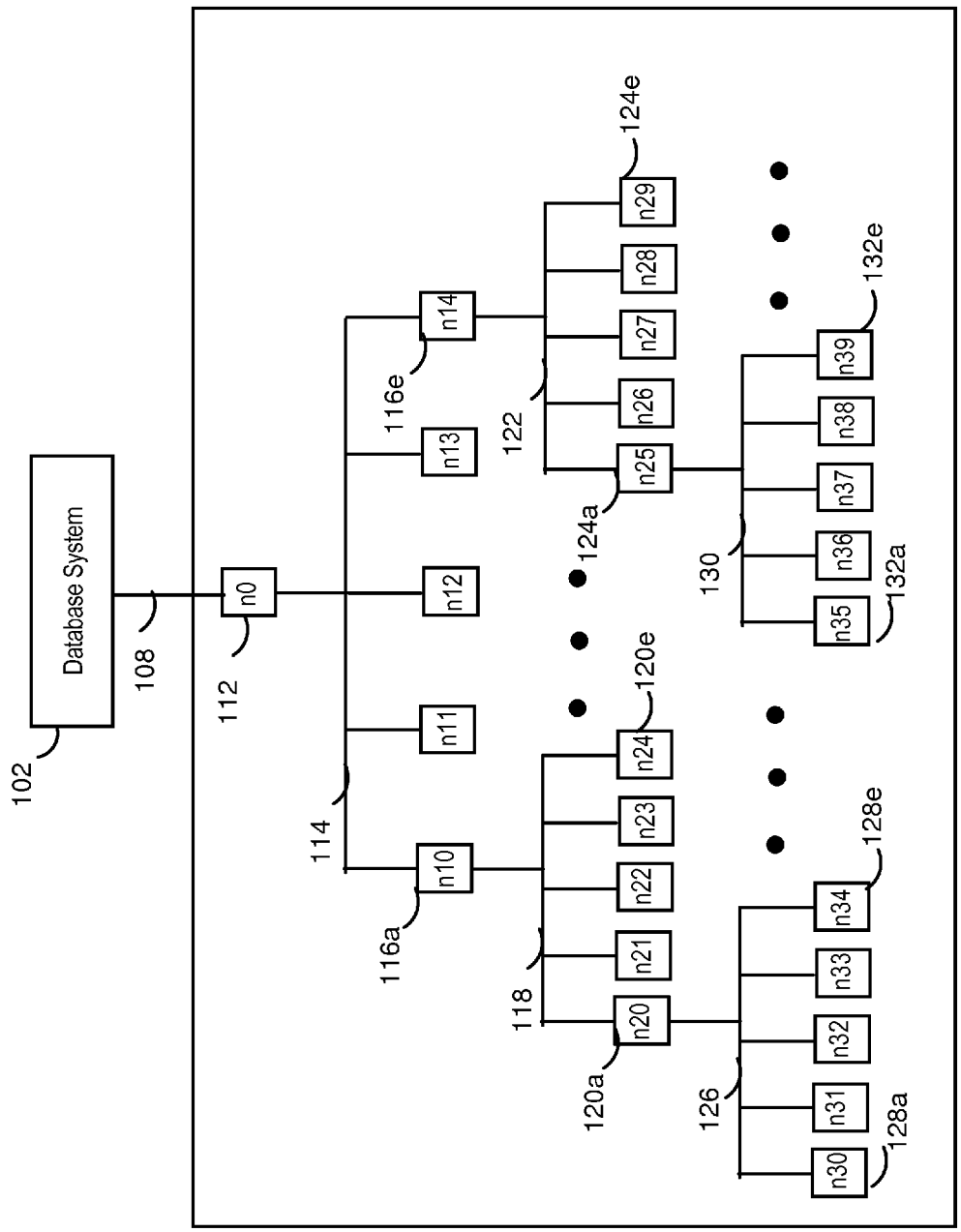
FIG. 1 depicts an example hierarchical system coupled to a database system.

FIG. 1 depicts an example heterogeneous system HS. The HS system includes a database system 102 and a plurality of compute nodes 112, 116a-e, 120a-e, 124a-e, 128a-e, 132a-e, and a plurality of interconnects 114, 118, 122, 126, 130. The compute nodes 112, 116a-e, 120a-e, 124a-e, 128a-e, 132a-e and interconnects 114, 118, 122, 126, 130 are arranged in one or more hierarchies. For example, one hierarchy includes compute nodes n0 112, n10-14 116a-e, n20-n24 120a-e, n30-34 128a-e. Nodes n30-34 128a-e are considered leaf nodes, while nodes n20-24 120a-e and n10-14 124a-e are considered intermediate or switch nodes and node n0 is considered a root node.

The operations for which assistance of the HS is sought are Sort and Set Operations. The Set operations include Union, Intersection, and Minus. The Union operations include Union, UnionAll, Union1, and Union2. Generic operations are defined and include the ability to perform one or more of the basic set operations and the sort operation. The Generic operations include A1GenMembership, A2GenMembership, A1Gen, and A2Gen.

The set operation s in SQL for relations RA and RB have the following definitions. RA UNION RB is defined as the set of all tuples in RA or RB, where duplicate tuples are only reported once. RA UNION ALL RB is defined as the set of all tuples in RA or RB. RA INTERSECT RB is the set of all tuples both in RA and in RB. RA MINUS RB is the set of all tuples in RA but not in RB. All of these operations require that the number, type, and order of columns in RA and RB match.

Generally, a sort or set operation is executed by the database system with the assistance of the HS in the follow manner, where each compute node in the HS acts as a producer of tuples.

For SORT, each compute node produces records of its partition of a relation in sorted order.

For UNION ALL, each compute node produces records of its partition of the relation A followed by records of its partition of the relation B.

For UNION, each compute node produces first the records of relation A, sorted and tagged to indicate which relation they belong to and then records of relation B, sorted and tagged to indicate which relation they belong to. Alternatively, instead of sorting, a compute node can provide a compact representation of its partition, such as a hash table or a structure similar to a Bloom filter, which can be used for a fast membership check.

For INTERSECT, if relation A is not larger than relation B, each compute node produces the common records of relation A and B and a compact representation of relation A and B.

For MINUS, each node processes the tuples of relation A that are not n relation B and compact representations of relation A and B.

Alternatively, the compute nodes produce sorted partitions, without attempting to compute intersections or exclusions, and leave the merging and actual computation to the database system or intermediary nodes.

Merging Results

In the case of UNION ALL, results from each compute node may be directly streamed to the top of the hierarchy and from there to the database query engine, because there is no further processing needed and no expectation of data reduction in any intermediary stage. For all the other operations, within each hierarchy of HS, compute nodes may collaborate (either directly with other compute nodes, or, if available via nodes at switches in the hierarchy), and merge their partial results. Merging at intermediary levels may lower the CPU usage on the hierarchy host and also on the database system.

In the case of UNION, merging sorted tuples of one relation A with tuples of another relation B, requires merging sorted relations of A and eliminating duplicates between the resulting sorted list from relation A and the other relation B. If compact representations, such as the membership arrays described below, of relation A and relation B are used, these compact representations are merged and then each tuple of the other relation is checked against the compact representation.

In the case of INTERSECT, the merged result consists of the union of passed intermediary results and of those tuples found in both relations from a node.

In the case of MINUS, a merge eliminates tuples in relation A and in relation B and those in both relation A and B.

Merging at the host in heterogeneous system as well as at the database system level follows the above rules.

Details

Figure 2A:
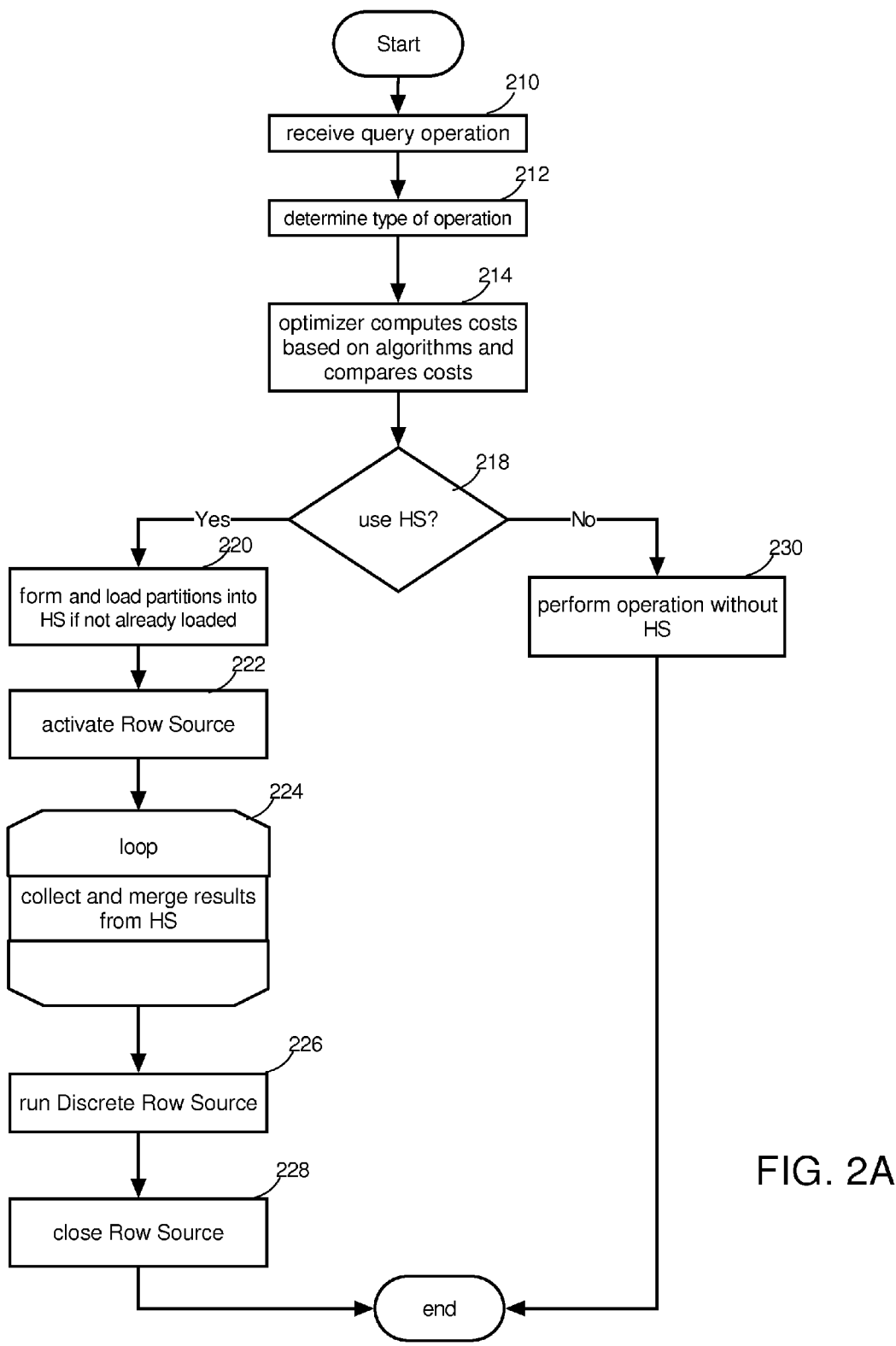
FIGS. 2A and 2B depict flow charts for the various steps of an embodiment.
Figure 2B:
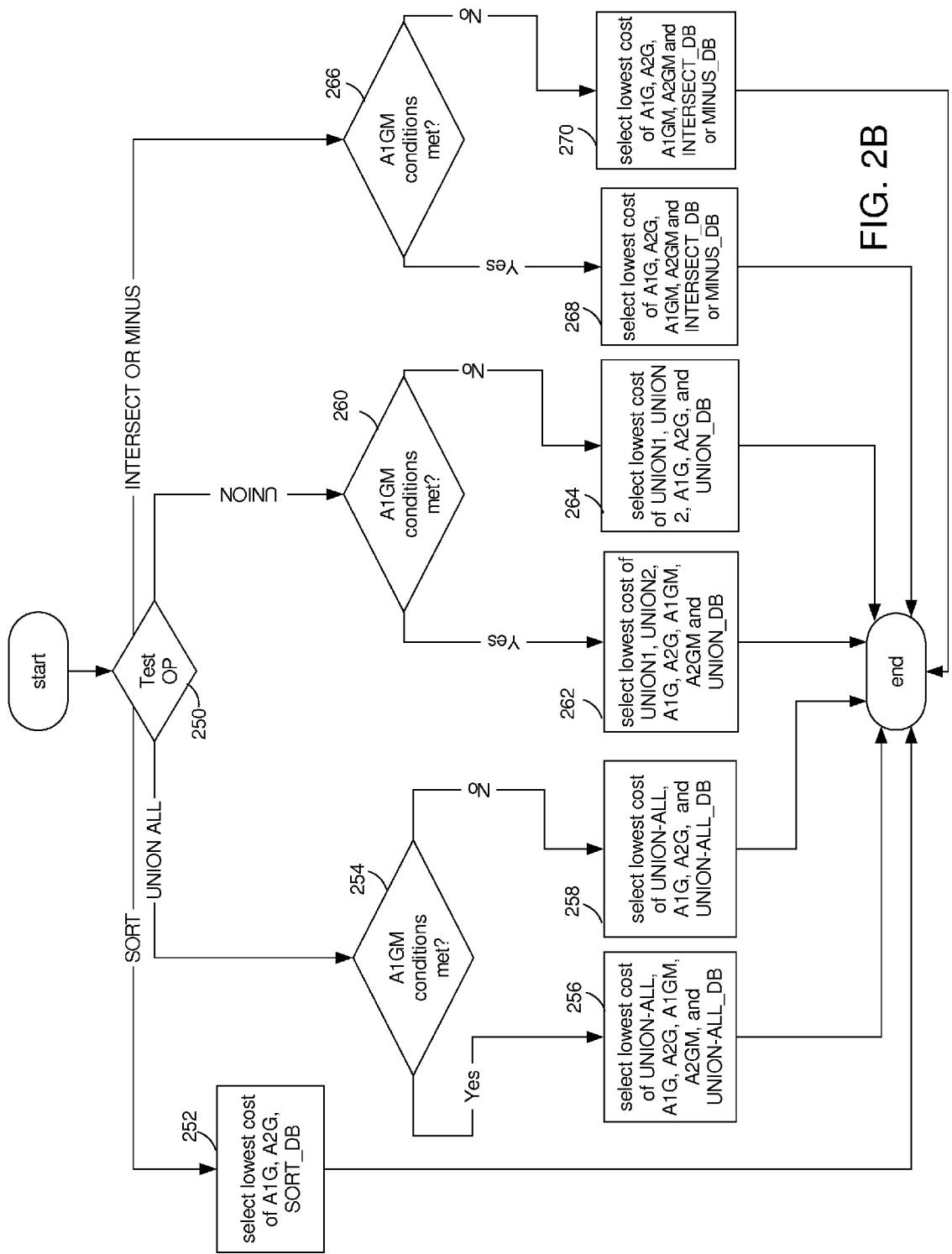

FIGS. 2A and 2B depict flow charts for the various steps of an embodiment. In FIG. 2A, the database system receives a request to perform query operation in step 210 on a pair of relations. The database system determines in step 212 the type of operation and an optimizer computes the costs of the operation in step 214 for each of a number of available algorithms based on the determined type and a cost model. The optimizer compares the costs so that the database system can determine whether assistance of the hierarchical system HS would improve performance of the query operation. If so as determined in step 218, then the database system partitions the relations and loads the partitions in step 220 into compute nodes in the HS if the partitions are not already loaded, after which it activates a row source in step 222. The heterogeneous system performs operations on its compute nodes throughout its hierarchy and returns results to consumer processes in the database system that are established to collect and merge the results in step 224. After collecting the results, the database system runs a discrete row source in step 226 to maintain transaction consistency, if some blocks are out of sync. The database system then closes the original row source in step 228. If the HS would not improve the results, the database system alone carries out the operation in step 230.

Optimizer

FIG. 2B depicts the steps for the optimizer, whose task is to select the lowest cost execution plan for executing the operation specified in the query, according to the cost model, described below. In step 250, the optimizer determines the type of operation in the query.

If OP=SORT, the optimizer chooses in step 252 the lowest cost plan among A1G, A2G, and a database sort.

If OP=UNION ALL and if conditions for AGM are met as determined in step 254, the optimizer selects the lowest cost plan among A-UNION-ALL, A1G, A2G, A1GM, A2GM and a database UNION-ALL in step 256. If the conditions for AGM are not met as determined in step 254, the optimizer selects the lowest plan among A-UNION-LL, A1G, A2G, and database UNION-ALL in step 258.

If OP=UNION and if conditions for AGM are met as determined in step 260, the optimizer selects the lowest cost plan among UNION1, UNION2, A1G, A2G, A1GM, A2GM and a database UNION in step 262. If the conditions are not met as determined in step 260, the optimizer selects the lowest cost plan among UNION1, UNION2, A1G, A2G and a database UNION in step 264.

If OP=INTERSECT OR MINUS and if conditions for AGM are met as determined in step 266, the optimizer selects the lowest cost plan among A1G, A2G, A1GM, A2GM, and a database operation in step 268. If the conditions are not met as determined in step 266, the optimizer selects the lowest cost plan among A1G, A2G, and the database operation in step 270.

Algorithms for each of the basic operations include a description of the processing at the node level, the switch/intermediary node level, and the database level.

RA UNION ALL RB

Figure 3:
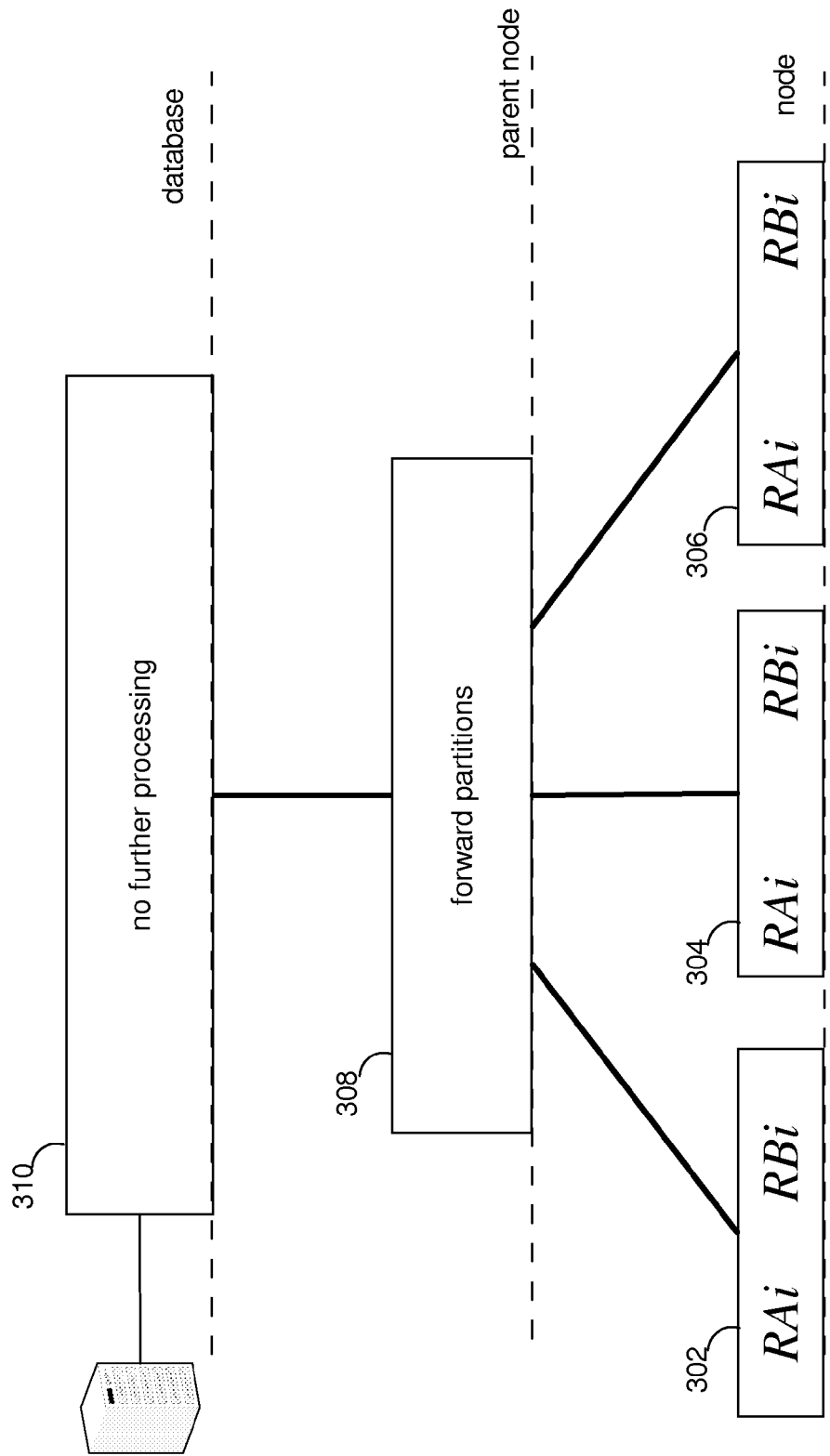
FIG. 3 depicts the details of the UNION ALL algorithm.

FIG. 3 depicts the details of the UNION ALL algorithm. At the node level 302, 304, 306 for the UNION ALL operation, RA UNION ALL RB, a particular node 302, 304, 306 sends its partition of relation A, RAi, followed by its partition of relation B, RBi to its parent node 308.

At the switch/intermediary node 308, the partitions are forwarded without any additional processing.

At the database level 310, no additional processing occurs.

RA UNION1 RB

Figure 4:
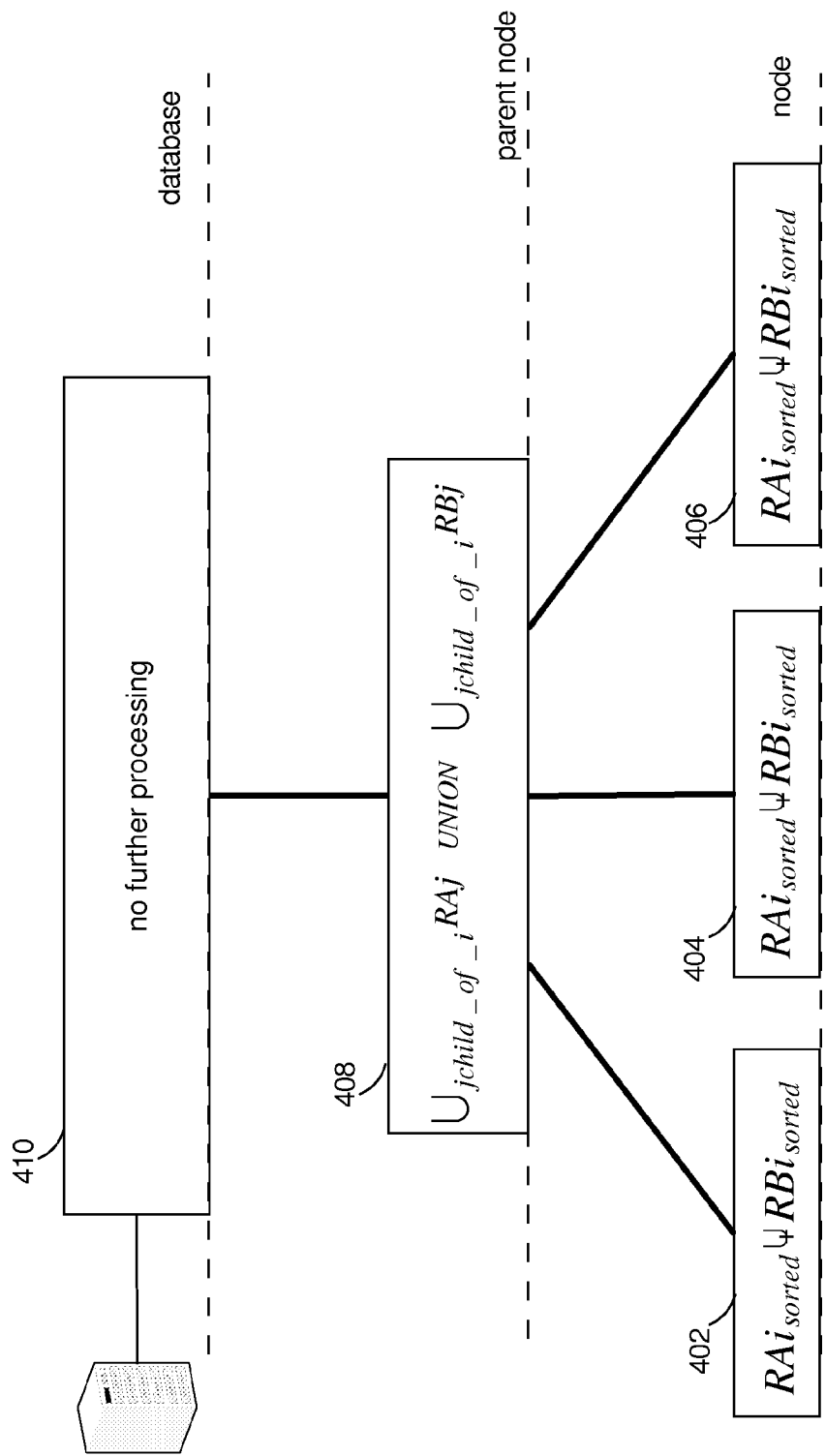
FIG. 4 depicts the details of the UNION1 algorithm.

FIG. 4 depicts the details of the UNION1 algorithm. At the node level, 402, 404, 406 for the A1UNION operation, RA UNION1 RB, a particular node 402, 404, 406 sorts its partition of relation A, RAi, and its partition of relation B, RBi, to create RAi-sorted and RBi-sorted. The particular node then computes relation $QABi=RAi_{sorted} \uplus RBi_{sorted}$, which is the same as the relation $RAi_{sorted}$ UNION $RBi_{sorted}$, except that each tuple is tagged with an extra bit to indicate whether it came from the RAi or RBi relation partition. The particular node then sends the tagged relation QABi to its parent node 408.

At the switch or intermediate node i 408 level for the A1UNION operation, a particular switch or intermediate node receives the tagged relations QABi from all of its children and buffers these relations. Each of these relations, by virtue of the operations at the node level, has had any duplicates removed. However, duplicates among the children may remain. The particular switch or intermediate node then processes all of the tagged relations QABi to remove any duplicates among them. Thus, the particular switch or intermediate node computes $\cup_{j\ child\ of\ i} RAj$ UNION $\cup_{j\ child\ of\ i} RBj$, where $\cup_{j\ child\ of\ i} RAj$ is the union of all of the child partitions of relation A and $\cup_{j\ child\ of\ i} RBj$ is the union of all of the child partitions of relation B. This is possible because the tagged relation QABi indicates whether a tuple came from the relation A partition or the relation B partition. If the switch or intermediate node is at the root of the hierarchy in the HS, the tags are removed before sending results to the database system.

At the database level 410, the data undergo no further processing. Because any intermediate node waits until it receives data from all of its children, the intermediate node can remove all of the duplicates among partitions of relation A and among partitions of relation B and between them.

RA UNION2 RB

Figure 5:
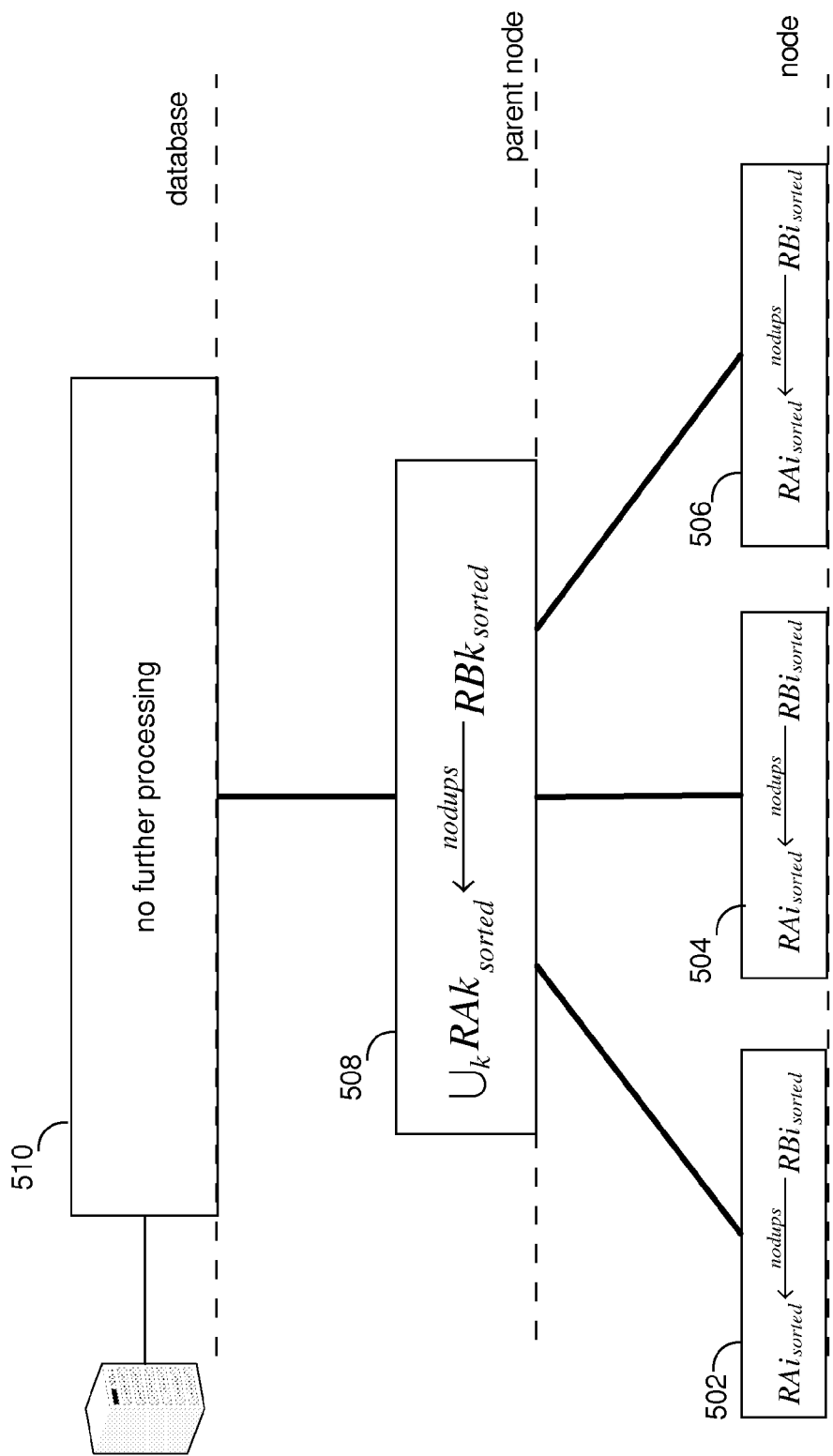
FIG. 5 depicts the details of the UNION 2 algorithm.

FIG. 5 depicts the details of the UNION2 algorithm. At the node level 502, 504, 506 for the A2UNION operation, RA UNION2 RB, a particular node 502, 504, 506 sorts its partition of relation A, RAi, to create $RAi_{sorted}$, buffers it and sends it to its parent node. It then sorts its partition of relation B, RBi, to create $RBi_{sorted}$ and sends to its parent all of the tuples in $RBi_{sorted}$ that are not in the buffered $RAi_{sorted}$, i.e., it eliminates any duplicate tuples between the partitions of relation A and relation B at the node level.

At the switch or intermediate node level 508, a particular switch or intermediate node waits to receive the $RAi_{sorted}$ from all of its children j and buffers these relations. It buffers any tuples received from $RBi_{sorted}$ that might arrive while it is waiting for all of the $RAi_{sorted}$ from its children. For each $RBi_{sorted}$ received from a particular child j, the node checks its tuples against the buffered $RAk_{sorted}$ from all children k and returns to its parent node only those tuples that were not found in any of the $RAk_{sorted}$. This guarantees that the final result has no duplicates, but does so with less space and longer time compared to UNION1.

At the database level 510, no additional processing is needed.

It should be noted that sorting the relation is done to facilitate the removal of duplicates. Any other technique that aids in the removal of duplicates can be used. For example, if a histogram of relation A, is available and shows that the relation has relatively few differently-valued tuples, then a hash table or a bitmap is a better alternative. In the case of a hash table, the node computes a hash table of RAi and looks for duplicate items in the tuples of RBi. In the case of a bitmap, the node maintains a bitmap, with a length equal to the maximum number of possible values in RA, the bitmap indicating which of all of these values are present in RAi. To find a duplicate tuple in RBi only requires to checking whether the bitmap position corresponding to the tuple is not 0. All the positions marked 0 need not be considered. The type of bit map that can aid in the removal of duplicates, however, is a slight modification of a standard bit map to allow for the possibility of multiple duplicate tuples. Such a bit map is called a membership representation and is described below.

Membership

A membership representation is a map that keeps track of the number of tuples having a distinct value. Suppose that two relations RA and RB have a DATE attribute, which can take at most 12 distinct values. Let RA have 2M tuples for each distinct value and RA have 1M tuples for each distinct value.

If a membership representation for RA is
[2M, 2M, 0, 0, 0, 0, 0, 0, 0, 0, 0, 2M] and
the membership representation for RB is
[0, 0, 0, 0, 0, 0, 1M, 1M, 1M, 1M, 1M, 1M], then:
the membership representation for RA UNION ALL RB is
[2M, 2M, 0, 0, 0, 0, 1M, 1M, 1M, 1M, 1M, 3M];
the membership representation for RA UNION RB is
[2M, 2M, 0, 0, 0, 0, 1M, 1M, 1M, 1M, 1M, 2M];

the membership representation for RA INTERSECT RB is [0, 0, 0, 0, 0, 0, 0, 0, 0, 0, 0, 1M]; and the membership representation for RA MINUS RB is [2M, 2M, 0, 0, 0, 0, 0, 0, 0, 0, 0, 0].

These succinct representations allow each node i that receives two succinct representations of the partitions RAj and RAk, RBj and RBk from children j and k to efficiently compute membership representations of RAj OP RAk where OP is any set operation. It is also possible to reconstruct the original partition RAi from the membership representation.

RA $OP_{A1GM}$ RB

Figure 6:
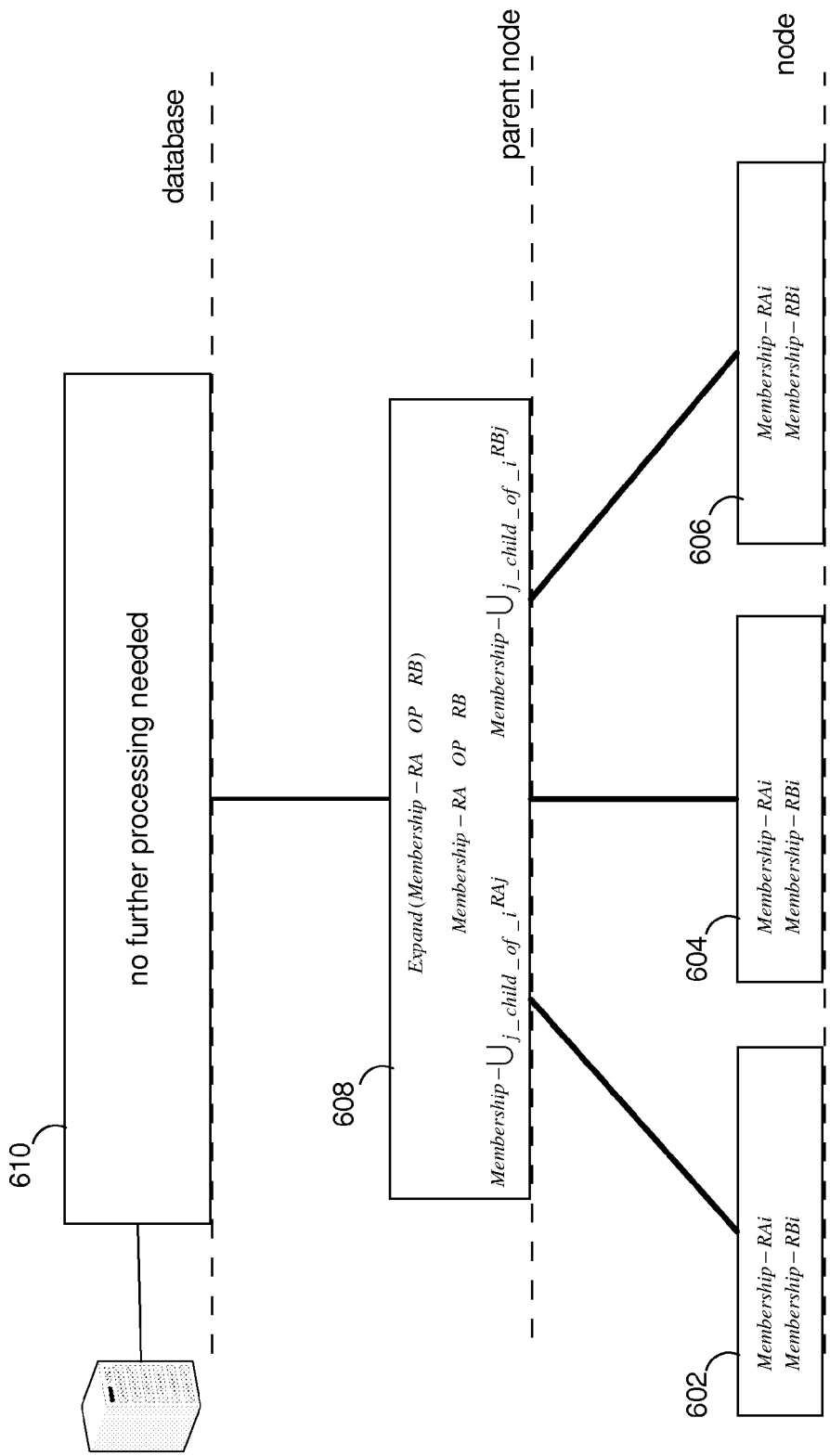
FIG. 6 depicts the details of the A1GM algorithm.

FIG. 6 depicts the details of the A1GM algorithm. RA $OP_{A1GM}$ RB computes set operations OP on the relations RA and RB, where OP can be UNION ALL, UNION, INTERSECT, or MINUS.

At the node level, for RA $OP_{A1GM}$ RB operation, the particular node 602, 604, 606 computes a membership representation of RAi, Membership-RAi, unless statistics indicate the membership information is already present in the node. The node 602, 604, 606 then sends the membership representation Membership-RAi to its parent node. The node computes the membership representation of RBi, Membership-RBi, and sends it to its parent node.

At the switch/intermediate node level 608, the switch or intermediate node 608 waits for Membership-RAi from all of its children j and computes the union of those memberships, Membership-$\cup_{j\ child\ of\ i}$ RAj. The node waits to receive Membership-RBi from all of its children j and computes the union of those memberships, Membership-$\cup_{j\ child\ of\ i}$ RBj. If the switch or intermediate node happens to be the root node, the node computes Membership-RA OP RB, based on the two received unions and then expands the Membership-RA OP RB back into RA OP RB and sends it to the database system. If the switch or intermediate node is not the root node, then the nodes sends the two received unions to its parent node.

At the database level 610, no further processing is needed.

Thus, the above algorithm percolates up the tree of nodes in the cluster the succinct representations of all partitions of RA and RB, each intermediary node computing the membership representation of the union of partitions of its children. Only the root node needs to unpack the succinct representation and send the results to the database system.

If sending actual tuples over the interconnect becomes a bottleneck when cost-estimating this plan, the system considers a simple variant in which the root node sends the membership information only, leaving the database system to handle the final computation of unpacking the results.

In order for the above algorithm to operate correctly, a number of conditions, called AGM conditions, is assumed to hold. The conditions are that (1) the database system has statistics on the maximum number NA of values that RA can take and their range; (2) the database has statistics on the maximum number NB of values RB can take and their ranges; (3) NA and NB are relatively small; (4) the database sends this information, together with the query plan, to the root of the cluster; and (5) every non-leaf node in the cluster forwards this information to their child nodes in the cluster.

RA $OP_{A2GM}$ RB

Figure 7:
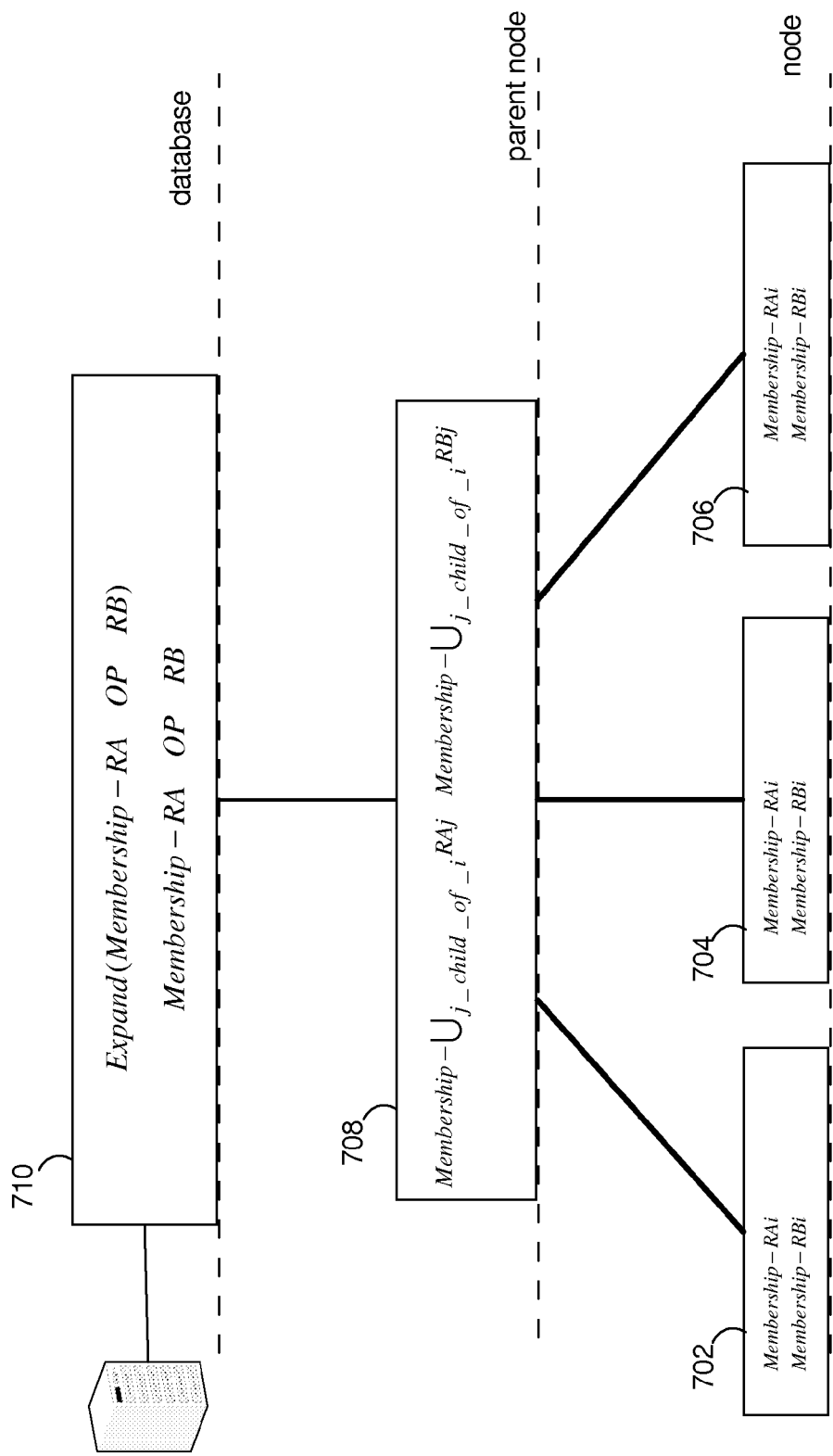
FIG. 7 depicts the details of the A2GM algorithm.

FIG. 7 depicts the details of the A2GM algorithm. RA $OP_{A2GM}$ RB computes set operations OP on the relations RA and RB, where OP can be UNION ALL, UNION, INTERSECT, or MINUS.

At the node level, a particular node 702, 704, 706 computes the membership representation of RAi, Membership-RAi, unless statistics indicate that the membership information is already present in the node. The particular node 702, 704, 706 then sends Membership-RAi to its parent node. The particular node also computes Membership-RBi, unless statistics indicate that the membership information is already present in the node. It then sends Membership-RBi to its parent node.

At the switch or intermediary node 708, the switch or intermediary node 708 waits to receive Membership-RAj from all of its child nodes j and upon receipt computes Membership-$\cup_{j\ child\ of\ i}$ RAj, which is the union of all of the Membership-RAj items from the child nodes. The switch or intermediary node waits to receive Membership-RBi from all of its child nodes j and upon receipt computes Membership-$\cup_{j\ child\ of\ i}$ RBj, which is the union of all of the Membership-RBj items from the child nodes.

At the database level 710, receive the Membership-$\cup_{j\ child\ of\ i}$ RAj and Membership-$\cup_{j\ child\ of\ i}$ RBj items and compute Membership-RA $OP_{A2}$ RB based on the received items. The database then expands the Membership-RA $OP_{A2GM}$ RB into RA $OP_{A2GM}$ RB to obtain the final result.

As mentioned before, an alternative strategy of the optimizer is to have each node in the cluster sort its partitions and leave to the database system the task of executing the set operations such as UNION, INTERSECT, or MINUS.

RA $OP_{A1G}$ RB

Figure 8:
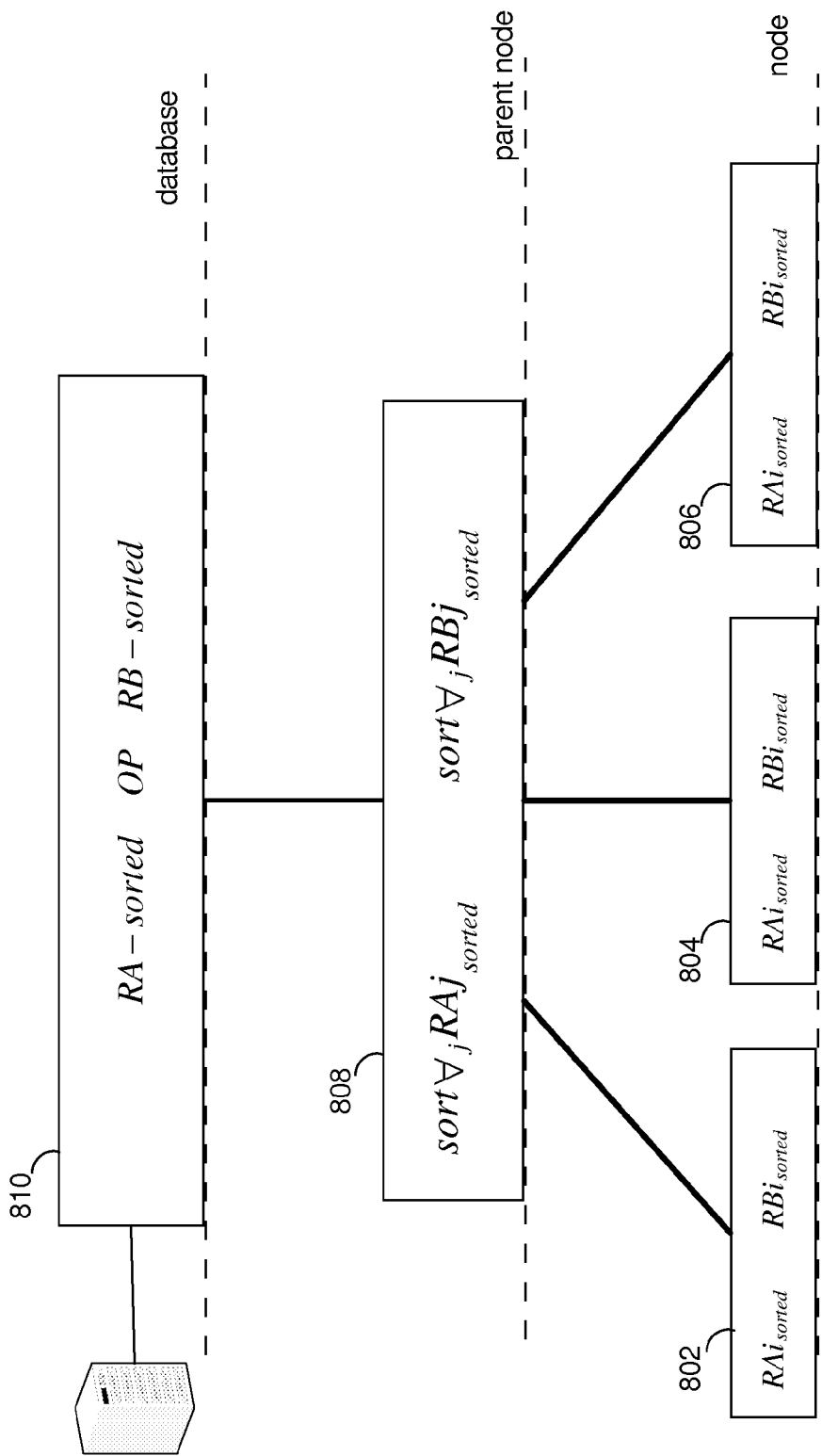
FIG. 8 depicts the details of the A1G algorithm.

FIG. 8 depicts the details of the A1G algorithm. RA $OP_{A1G}$ RB computes set and sort operations OP on relations RA and RB, where OP can be UNION, INTERSECT, MINUS or SORT.

At the node level, a particular node 802, 804, 806 sorts RAi into RAi-sorted and RBi into RBi-sorted. The particular node then sends RAi-sorted and RBi-sorted to the parent node.

At the switch or intermediary node level, the switch or intermediary node 808 sorts all of its j child RAi-sorted relations and sends the result to its parent node. The switch or intermediary node sorts all of its j child RBi-sorted relations and sends the result to its parent node. If the switch or intermediate node is the root node, the full RA-sorted and RB-sorted are sent to the database.

At the database level 810, the database computes RA-sorted OP RB-sorted, where OP is UNION, INTERSECT, MINUS or SORT. The result is the same as RA OP RB.

In one alternative, the root computes RA-sorted OP RB-sorted, and the database does no further processing.

RA $OP_{A2G}$ RB

Figure 9:
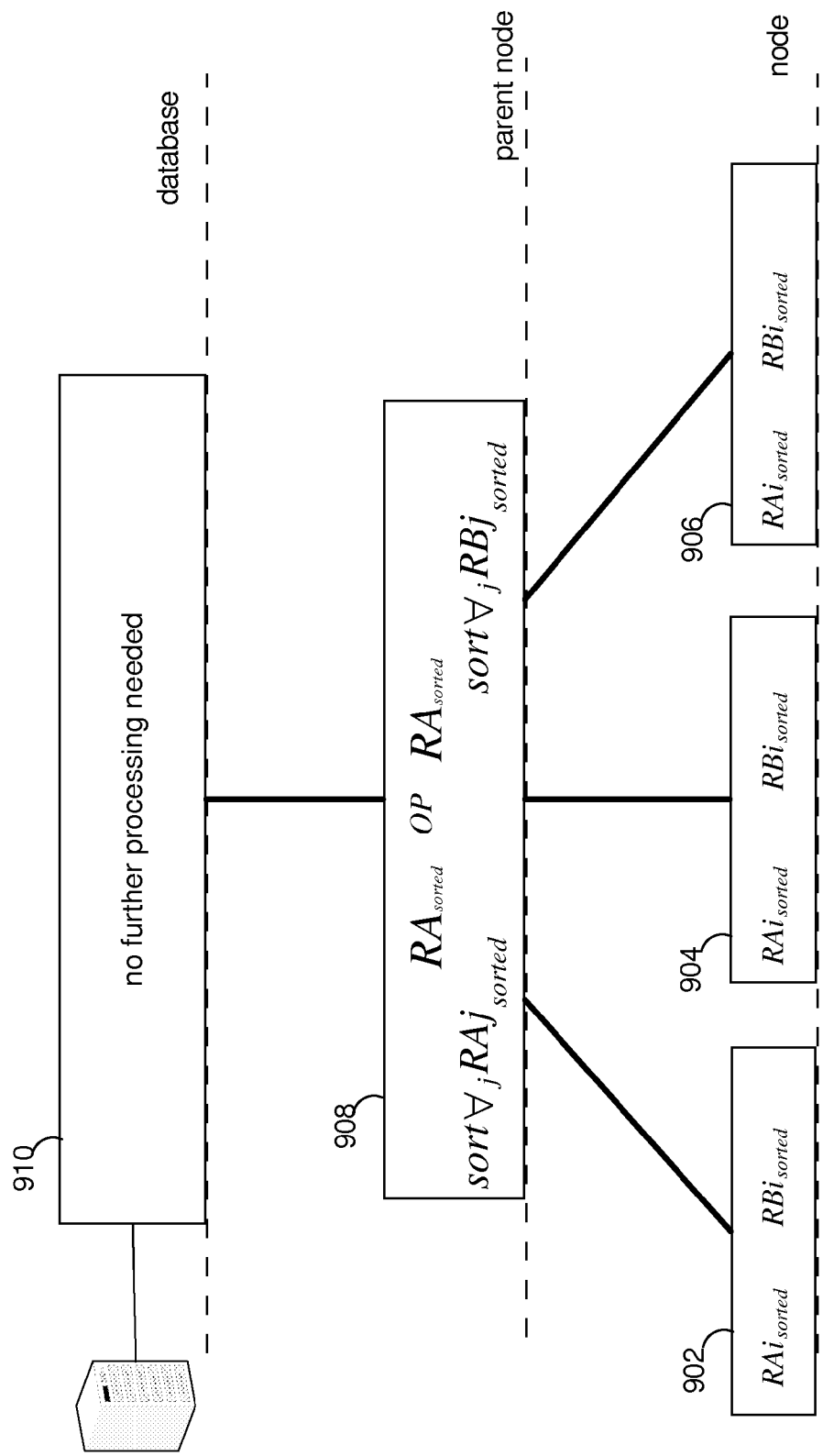
FIG. 9 depicts the details of the A2G algorithm.

FIG. 9 depicts the details of the A2G algorithm. RA $OP_{A2G}$ RB computes set and sort operations OP on relations RA and RB, where OP can be UNION, INTERSECT, MINUS, or SORT.

At the node level, a particular node 902, 904, 906 sorts RAi into RAi-sorted and RBi into RBi-sorted. The particular node 902, 904, 906 then sends RAi-sorted and RBi-sorted to its parent node.

At the switch or intermediary node level, the switch or intermediary node 908 sorts all of the RAj-sorted coming from its j children and sends the result to its parent node, unless the switch or intermediary node is the root node. The switch or intermediary node 908 sorts all of the RBj-sorted coming from its j children and send the result to its parent node. If the switch or intermediary node 908 is the root node, the node computes RA-sorted OP RB-sorted and sends the result to the database system.

At the database level 910, the database system receives the final result.

Cost Model

The chart presents the various parameters used in the computation of costs and benefits of the above described algorithms.

| Parameter | Definition | Meaning |
|---|---|---|
| card(RA) | | cardinality of RA |
| card(RB) | | cardinality of RB |
| card(RAB) | card(RA) + card(RB) | sum of cardinalities of RA and RB |
| card(RAn) | card(RA)/n | |
| card(RBn) | card(RB)/n | |
| $card_d(RA)$ | | distinct cardinality of RA, i.e., number of distinct values in the entire relation RA |
| $card_d(RB)$ | | distinct cardinality of RB, i.e., number of distinct values in the entire relation RB |
| $card_d(RAB)$ | | sum of distinct cardinalities of RA and RB |
| card(RA OP RB) | | cardinality of result of operation |
| $f_{scan}$ | | rate at which any leaf node n can scan relations of the signature of RA or RB and send them to the parent node. |
| $f_{DBscan}$ | | time for the database to scan the relations |
| $f_{sorti}$ | | rate of sorting a partition on a node i |
| $f_{sortDB}$ | | rate at which database system producer processes execute sort operation |
| $f_{OpOnSortedDB}$ | | rate of performing set operation OP in database system when relations are already sorted; if OP = sort, then parameter = 0. |
| $f_{OpOnSortedHS}$ | | rate of performing set operation OP in HS on sorted relations |
| $f_{OpOnMHS}$ | | rate at which the root node in the HS computes the OP operation based on membership succinct representations of the relations involved in OP |
| $f_{expandHS}$ | | rate at which the root node in the HS can expand a succinct membership representation into the actual set of tuples |
| $f_{expandDB}$ | | rate at which the database system can expand a succinct membership representation into the actual set of tuples |
| $f_{sortHS}$ | $\sum_{i=0}^{H} N_i \times \frac{f_{sort,i}}{n}$ | sort rate in HS (leaf nodes sorting partitions in parallel, followed by parent nodes merge-sorting data from all their children, also in parallel, followed by root node merge sorting all sorted data received from its direct children |
| $f_{M,0}$ | | rate at which leaf nodes can compute the membership succinct representation for relations of the signature of RA and RB |
| $f_{M,i}$ | | rate at which nodes at level i can merge membership representations from multiple sources to produce a representation of the union of the sources |
| | fscan * card(RAn) | time spend by node n scanning records of RAn |
| | fscan * card(RBn) | time spend by node n scanning records of RBn |
| LHSi | | latency on the communication links in the HS between nodes at a level i and their parent nodes, where leaf-nodes are considered at level 0 and H is the height of the cluster tree. |
| $L_{HS}$ | $\sum_{i=0}^{H-1} \frac{L_{HSi} \times N_i}{n}$ | total latency in the HS cluster |
| $L_{HSDB}$ | | latency on the communication link between the root of HS and the database system, where the cluster is such that non-leaf nodes at the same level i have the same number Ni of leaf-node children |
| $L_{DB}$ | | latency on interconnect between producers and consumers in parallel execution on database system |
| $T_{HS\text{-}A\text{-}UNION\text{-}ALL}$ | $\left(\frac{f_{scan}}{n} + L_{HS} + L_{HSDB}\right) \times$ card(RAB) | total time taken to execute A-UNION-ALL in HS |
| powerHS | | power required for the HS to operate |
| powerDB | | power required for the DB to operate |
| $C_{HS\text{-}A\text{-}UNION\text{-}ALL}$ | $\dfrac{T_{HS\_A\_UNION\_ALL}}{powerHS}$ | cost of the plan |
| $T_{DB\text{-}UNION\text{-}ALL}$ | $fDB_{scan} \times$ card(RAB) | time to execute operation in database system |

| Parameter | Definition | Meaning |
|---|---|---|
| $C_{DB-UNION-ALL}$ | $\dfrac{T_{DB-UNION-ALL}}{powerDB}$ | cost to execute the operation in the database system |
| DOP | | degree of parallelism in database system |
| $T_{DBGEN}$ | $f_{sortDB} \times \dfrac{card(RAB)}{DOP} +$ $(L_{DB} + f_{OPOnSortedDB}) \times$ $card(RAB)$ | time for parallel sort of both relations with DOP degree of parallelism in database system |
| $T_{HSA1G}$ | $(f_{sortHS} + L_{HS} + L_{HSDB} +$ $f_{OPOnSortedDB}) \times$ $card(RAB)$ | time for HS to perform A1G algorithm in HS for a set operation OP. |
| t1GEN | $f_{M,0} \times \dfrac{card(RAB)}{n}$ | time to compute membership array |
| t2GEN | $\sum_{i=0}^{H-1} (L_{HS,i} + f_{M,i+1}) \times$ $card_d(RAB)$ | time to merge membership arrays |
| t3GEN | $f_{OPOnMHS} \times card_d(RAB)$ | time to compute operation on membership arrays |
| t4GEN | $f_{OPOnMDB} \times card_d(RAB)$ | time to computer operation on membership arrays in database system |
| t5GEN | $(f_{expandHS} + L_{HSDB}) \times$ $card_d(RAB)$ | time to expand membership arrays back to tuples in HS |
| t6GEN | $(f_{expandDB} + L_{HSDB}) \times$ $card_d(RAB)$ | time to expand membership arrays back to tuples in database system |
| t7GEN | $L_{HSDB} \times card_d(RAB)$ | latency to obtain results from HS to database system |

UNION All

The time taken to execute UNION All is $$T_{HS-A-UNION-ALL} = \left(\dfrac{f_{scan}}{n} + L_{HS} + L_{HSDB}\right) \times card(RAB).$$

The optimizer decides to execute the UNION ALL operation in the HS if $$\dfrac{f_{scan}/n + L_{HS} + L_{HSDB}}{powerHS} < \dfrac{fDB_{scan}}{powerDB}$$

A1G

The time taken to execute the A1G algorithm in a heterogeneous system for a set operation OP is $$T_{HSA1G} = (f_{sortHS} + L_{HS} + L_{HSDB} + f_{OpOnSortedDB}) \times card(RAB).$$

The optimizer decides to execute the A1G algorithm in the HS if $$\dfrac{f_{sortHS} + L_{HS} + L_{HSDB}}{powerHS} < \dfrac{f_{sortDB}/DOP + L_{DB}}{powerDB}.$$

A2G

The time taken to execute A2G in a heterogeneous system for a set operation OP is $$(f_{sortHS} + L_{HS}) \times card(RAB) + L_{HSDB} \times card(RA\ OP\ RB).$$

The optimizer decides to execute the A2G algorithm in the HS if $$\dfrac{f_{OPOnSortedHS} \times card(RAB) - L_{HSDB} \times (card(RAB) - card(RA\ OP\ RB))}{powerHS} < \dfrac{f_{OPOnSortedDB} \times card(RAB)}{powerDB}.$$

A1GM

The time taken to execute A1GM in the heterogeneous system for operation OP is $$T_{HSA1GM} = t1GEN + t2GEN + t3GEN + t5GEN.$$

A2GM

The time taken to execute A2GM in the heterogeneous system for operation OP is $$T_{HSA2GM} = t1GEN + t2GEN + t7GEN + t4GEN + t6GEN.$$

Selection Between A1GM and A2GM

The optimizer decides to execute the A1GM algorithm versus the A2GM algorithm in the HS if $$\dfrac{T_{HSA2GM}}{powerHS} \times \dfrac{T_{HSA1GM}}{powerHS}.$$

This occurs when the overhead of the database system performing the operation on succinct representations followed by an expansion versus the HS performing it is less than the overhead of sending full records rather than succinct representations over the interconnect between the cluster and the database system.

Example

Consider a cluster with 256 leaf nodes and a single level in the tree (H=1). Assume, as a simplification, that $L_{DB}$=0 and DOP=1. If the compute power of both leaf and root nodes is about $\frac{1}{10}$ of that of the database system, i.e., $f_{sort,0}$=$f_{sort,1}$=10×$f_{sortDB}$, then the optimizer chooses sorting in the cluster, i.e., A1G, which for SORT is the same as A2G. versus sorting in the database system if $$\frac{L_{HS0}}{256} + L_{HSDB} < \left(power_{fraction} - \frac{10}{256} - 10\right) \times f_{sortDB}.$$

If the cluster is not operating at least 10.04 times the power for the database system, then offloading to the cluster should not be done. This example shows that always choosing the HS is not a good strategy.

In most systems, it is expected that the cluster operates at about 40 times that of the power required by the database system. For such systems, the optimizer chooses to use the HS for the SORT if $$\frac{L_{HS0}}{256} + L_{HSDB} < (30 - 0.04) \times f_{sortDB} \cong 29.9 \times f_{sortDB}.$$

If the cluster can sustain about 8 GB/sec on its interconnect, then the optimizer chooses offloading the SORT operation to the HS if sorting in the database system is at least 8/29.9=0.268 GB/sec.

A current known benchmark lists the current record for sorting as 1 TB/minute for a system of 52 nodes, which, assuming perfect scaling, amounts to an average of 0.32 GB/sec per node. Similar calculations show that if the root node is of the same compute power as the database node, and all other assumptions remain the same, then the optimizer uses the HS for the SORT when the sorting throughput in the database system is less than 0.25 GB/sec. If the database system has a sorting throughput of 0.1 GB/sec, then using the HS gives a twofold improvement in throughput per watt.

If the operation is one in which a reduction (like INTERSECT or MINUS) in the number of tuples is expected to occur and the reduction is about 50% from the leaf-nodes to the root, the optimizer uses the HS when the operation can be carried out in the database system at less than 0.10 GB/sec.

Transactional Consistency

Heterogeneous systems do not have a way of permanently sorting a redo log, so they do not guarantee transactional semantics. The overall guarantee is that the execution engine returns output vectors for data as of a snapshot consistent with that expected by the database system and the block numbers that are not synchronized with the database system in all materialized relations involved with the query.

The Fetch Method of a consumer process on the database side for SORT or SET operations detects whether block numbers for skipped blocks are returned as part of sub-query evaluation. If the number of blocks is small, then a majority of the blocks in the underlying materialized relations involved in the operation is in sync with the database system; only a few blocks are inconsistent between the database system and the HS. The fetch method then passes block numbers to the query coordinator.

The query coordinator waits until all consumers are finished processing their payloads and then gathers the blocks returned as unprocessed from all consumers. Upon receiving the unprocessed block numbers, the query coordinator starts a special SORT or SET operation row source to specifically handle these blocks. These row sources are called discreteSort, discreteUnion(ALL), discreteIntersect and discreteMinus to distinguish them from standard row sources that take into account all blocks of the underlying sub-queries or relations. The discrete row sources are executed entirely by the query coordinator and are a discrete variant of the underlying row source. The discrete row source is passed a pointer to the structures for sorted results or alternative set-membership compact representations computed during merging of local results from the producers.

As part of the Fetch Method, Fetch is called on the underlying discrete row sources, which eventually call the discrete table scan row sources for all underlying materialized relations. The discrete tables scan row sources ignore all blocks that are not directly passed (for those, the operation has already been carried out, because those blocks were in sync with the database system). For all other blocks, the scan is done as standard, and the discrete parent row sources are called recursively. The discrete SORT or SET operation fetch is done as standard, with the only exception that the sorted structures or membership representations passed at open time are used. With this method, when the discrete row source is closed, the passed sort structure contains the final result of the original SORT execution.

If, at any point during the discrete row source execution, the system estimates that the overhead of completing the computation is approximately equal to re-executing the entire operation solely in the database system, then the query execution engine can discard all results obtained so far and restart the execution of the query without the assistance of the HS.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
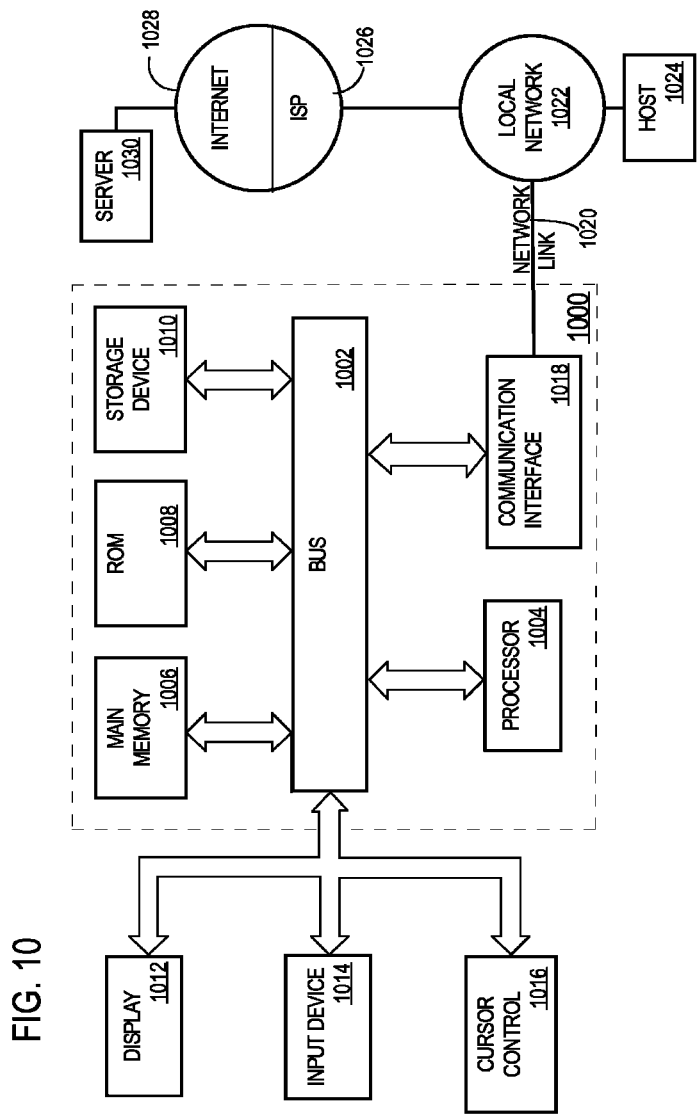
FIG. 10 depicts an example computer system.

For example, FIG. 10 is a block diagram that depicts a computer system 1000 upon which an embodiment may be implemented. Computer system 1000 includes a bus 1002 or other communication mechanism for communicating information, and a hardware processor 1004 coupled with bus 1002 for processing information. Hardware processor 1004 may be, for example, a general-purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, convert computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method of performing a query operation on a pair of relations in a database system coupled to a plurality of compute nodes, the method comprising: receiving a request to perform the query operation on the pair of relations; determining a type of query operation from the request;

computing a first cost of performing the query operation on the database system without assistance of the plurality of compute nodes, each compute node of the plurality of compute nodes comprising at least one processor and its own main memory;

computing one or more second costs of performing the query operation on the database system with assistance of the plurality of compute nodes using one or more algorithms, wherein the plurality of compute nodes is arranged in one or more hierarchies each comprising a root compute node, a plurality of leaf compute nodes, and a plurality of intermediate compute nodes, wherein performing the query operation on the database system with the assistance of the plurality of compute nodes comprises performing portions of the query operation on one or more of the plurality of compute nodes;

comparing the first cost and the one or more second costs to determine whether to perform the query operation with the assistance of the plurality of compute nodes using a particular algorithm of the one or more algorithms;

if it is determined to perform the query operation with the assistance of the plurality of compute nodes, performing portions of the query operation in accordance with the particular algorithm on the pair of relations on one or more of the plurality of compute nodes.

2. The method of claim 1, further comprising maintaining transaction semantics for the query operation in the database system.

3. The method of claim 1,
wherein the query operation is a SORT operation;
wherein computing the one or more second costs of performing the query operation on the database system with the assistance of the plurality of compute nodes includes:
computing a cost of the SORT operation using an A1G algorithm; and
computing a cost of the SORT operation using an A2G algorithm.

4. The method of claim 1,
wherein the requested query operation is a UNION ALL operation;
wherein computing the one or more second costs of performing the query operation on the database system with the assistance of the plurality of compute nodes includes:
computing a cost of the UNION ALL operation using an A-UNION-ALL algorithm;
computing a cost of the UNION ALL operation using an A1G algorithm; computing the a cost of the UNION ALL operation using an A2G algorithm; and if A1GM conditions are met:
computing a cost of the UNION ALL operation using an A1GM algorithm; and computing the a cost of the UNION ALL operation using an A2GM algorithm.

5. The method of claim 1,
wherein the query operation is a UNION operation;
wherein computing the one or more second costs of performing the query operation on the database system with the assistance of the plurality of compute nodes includes:
computing a cost of the UNION operation using an A-UNION algorithm;
computing a cost of the UNION operation using an A1G algorithm;
computing a cost of the UNION operation using an A2G algorithm; and if A1GM conditions are met:
computing a cost of UNION operation using an A1GM algorithm; and
computing the a cost of the UNION operation using an A2GM algorithm.

6. The method of claim 1,
wherein the query operation is a MINUS or INTERSECT operation;
wherein computing the one or more second costs of performing the query operation on the database system with the assistance of the plurality of compute nodes includes:
computing a cost of the MINUS or INTERSECT operation using an A1G algorithm;
computing a cost of the MINUS or INTERSECT operation using an A2G algorithm;
computing a cost of the MINUS or INTERSECT operation using an A1GM algorithm; and
computing a cost of the MINUS or INTERSECT operation using an A2GM algorithm.

7. A computer system for performing a query operation on a pair of relations, the system comprising:
a database system; and
a plurality of compute nodes arranged in one or more hierarchies coupled to the database system, each compute node of the plurality of compute nodes comprising at least one processor and its own main memory;
wherein each hierarchy of the one more hierarchies comprises a plurality of leaf compute nodes, a plurality of intermediate compute nodes and a root compute node;
wherein the database system is configured to:
receive a request to perform the query operation on the pair of relations;
determine a type of query operation from the request;
compute a first cost of performing the query operation on the database system without assistance of the plurality of compute nodes;
compute one or more second costs of performing the query operation on the database system with assistance of the plurality of compute nodes using one or more algorithms,
wherein performing the query operation on the database system with the assistance of the plurality of compute nodes comprises performing portions of the query operation on one or more of the plurality of compute nodes;
compare the first cost and the one or more second costs to determine whether to perform the query operation with the assistance of the plurality of compute nodes using a particular algorithm of the one or more algorithms;
if it is determined to perform the query operation with the assistance of the plurality of compute nodes, perform portions of the query operation in accordance with the particular algorithm on the pair of relations on one or more of the plurality of compute nodes.

8. The system of claim 7, wherein the database system is further configured to maintain transaction semantics for the query operation in the database system.

9. The system of claim 7,
wherein the query operation is a SORT operation;
wherein the database being configured to compute the one or more second costs of performing the query operation on the database system with the assistance of the plurality of compute nodes includes being configured to:
compute a cost of the SORT operation using an A1G algorithm; and compute a cost of the SORT operation using an A2G algorithm.

10. The system of claim 7,
wherein the query operation is a UNION ALL operation;
wherein the database being configured to compute the one or more second costs of performing the query operation on the database system with the assistance of the plurality of compute nodes includes being configured to:
compute a cost of the UNION ALL operation using an A-UNION-ALL algorithm;
compute a cost of the UNION ALL operation using an A1G algorithm;
compute a cost of the UNION ALL operation using an A2G algorithm;
compute a cost of the UNION ALL operation using an A1GM algorithm; and
compute a cost of the UNION ALL operation using an A2GM algorithm.

11. The system of claim 7,
wherein the query operation is a UNION operation;
wherein the database being configured to compute the one or more second costs of performing the query operation on the database system with the assistance of the plurality of compute nodes includes being configured to:
compute a cost of the UNION operation using an A-UNION algorithm;
compute a cost of the UNION operation using an A1G algorithm;
compute a cost of the UNION operation using an A2G algorithm;
compute a cost of the UNION operation using an A1GM algorithm; and
compute a cost of the UNION operation using an A2GM algorithm.

12. The system of claim 7,
wherein the query operation is a MINUS or INTERSECT operation; wherein the database being configured to compute the one or more second costs of performing the query operation on the database system with the assistance of the plurality of compute nodes includes being configured to:
compute a cost of the MINUS or INTERSECT operation using an A1G algorithm;
compute a cost of the MINUS or INTERSECT operation using an A2G algorithm;
compute a cost of the MINUS or INTERSECT operation using an A1GM algorithm; and
compute a cost of the MINUS or INTERSECT operation using an A2GM algorithm.

13. A non-transitory computer-readable medium carrying one or more sequences of instructions for performing a query operation on a pair of relations in a database system coupled to a plurality of compute nodes, wherein execution of the one or more sequences by one or more processors causes:
receiving a request to perform a query operation on the pair of relations;
determining a type of query operation from the request;
computing a first cost of performing the query operation on the database system without assistance of the plurality of compute nodes, each compute node of the plurality of compute nodes comprising at least one processor and its own main memory;
computing one or more second costs of performing the query operation on the database system with assistance of the plurality of compute nodes using one or more algorithms,
wherein the plurality of compute nodes is arranged in one or more hierarchies each comprising a root compute node, a plurality of leaf compute nodes, and a plurality of intermediate compute nodes,
wherein performing the query operation on the database system with the assistance of the plurality of compute nodes comprises performing portions of the query operation on one or more of the plurality of compute nodes;
comparing the first cost and the one or more second costs to determine whether to perform the query operation with the assistance of the plurality of compute nodes using a particular algorithm of the one or more algorithms;
if it is determined to perform the query operation with the assistance of the plurality of compute nodes, then performing portions of the query operation in accordance with the particular algorithm on the pair of relations on one or more of the plurality of compute nodes.

14. The computer-readable medium of claim 13, wherein the one or more sequences of instructions include instructions whose execution by the one or more processors further causes maintaining transaction semantics for the query operation in the database system.

15. The computer-readable medium of claim 13,
wherein the query operation is a SORT operation;
wherein computing the one or more second costs of performing the query operation on the database system with the assistance of the plurality of compute nodes includes:
computing a cost of the SORT operation using an A1G algorithm; and
computing a cost of the SORT operation using an A2G algorithm.

16. The computer-readable medium of claim 13,
wherein the query operation is a UNION ALL operation;
wherein computing the one or more second costs of performing the query operation on the database system with the assistance of the plurality of compute nodes includes:
computing a cost of the UNION ALL operation using an A-UNION-ALL algorithm;
computing a cost of the UNION ALL operation using an A1G algorithm;
computing the a cost of the UNION ALL operation using an A2G algorithm; and if A1GM conditions are met:
computing a cost of the UNION ALL operation using an A1GM algorithm; and
computing a cost of the UNION ALL operation using an A2GM algorithm.

17. The computer-readable medium of claim 13,
wherein the query operation is a UNION operation;
wherein computing the one or more second costs of performing the query operation on the database system with the assistance of the plurality of compute nodes includes:
computing a cost of the UNION operation using an A-UNION algorithm;
computing a cost of the UNION operation using an A1G algorithm;
computing a cost of the UNION operation using an A2G algorithm; and if A1GM conditions are met:
computing a cost of the UNION operation using an A1GM algorithm; and computing a cost of the UNION operation using an A2GM algorithm.

18. The computer-readable medium of claim 13,
wherein the query operation is a MINUS or INTERSECT operation;
wherein computing the one or more second costs of performing the query operation on the database system with the assistance of the plurality of compute nodes includes:
   computing a cost of the MINUS or INTERSECT operation using an A1G algorithm;
   computing a cost of the MINUS or INTERSECT operation using an A2G algorithm;
   computing a cost of the MINUS or INTERSECT operation using an A1GM algorithm; and
   computing a cost of the MINUS or INTERSECT operation using an A2GM algorithm.

* * * * *